(12) United States Patent
Kanzelberger

(10) Patent No.: US 10,275,518 B2
(45) Date of Patent: Apr. 30, 2019

(54) INTEGRATED PHONETIC MATCHING METHODS AND SYSTEMS

(75) Inventor: Kirk G. Kanzelberger, Shoreline, WA (US)

(73) Assignee: TIBCO SOFTWARE INC., Palo Alto, CA (US)

( * ) Notice: Subject to any disclaimer, the term of this patent is extended or adjusted under 35 U.S.C. 154(b) by 293 days.

(21) Appl. No.: 13/098,435

(22) Filed: Apr. 30, 2011

(65) Prior Publication Data
US 2012/0278315 A1 Nov. 1, 2012

(51) Int. Cl.
*G06F 17/30* (2006.01)

(52) U.S. Cl.
CPC .................. *G06F 17/30681* (2013.01)

(58) Field of Classification Search
USPC .......................................................... 707/723
See application file for complete search history.

(56) References Cited

U.S. PATENT DOCUMENTS

| | | | |
|---|---|---|---|
| 6,321,226 B1* | 11/2001 | Garber et al. | |
| 8,346,791 B1* | 1/2013 | Shukla .............. | G06F 17/30864 707/759 |
| 8,370,282 B1* | 2/2013 | Leung et al. ................... | 706/20 |
| 2004/0059731 A1* | 3/2004 | Yianilos et al. ................... | 707/5 |
| 2004/0199905 A1* | 10/2004 | Fagin ................. | G06F 17/2247 717/136 |
| 2006/0161528 A1* | 7/2006 | Dettinger et al. ................ | 707/3 |
| 2007/0005567 A1 | 1/2007 | Hermansen et al. | |
| 2007/0073643 A1* | 3/2007 | Ghosh .............. | G06F 17/30463 |
| 2007/0198501 A1* | 8/2007 | Sundaranatha ... | G06F 17/30448 |
| 2008/0046405 A1 | 2/2008 | Olds et al. | |
| 2008/0082505 A1* | 4/2008 | Kokubu et al. ................... | 707/3 |
| 2008/0270344 A1* | 10/2008 | Yurick .............. | G06F 17/30026 |
| 2009/0100033 A1* | 4/2009 | Kim ..................... | G06F 21/6227 |
| 2010/0250524 A1* | 9/2010 | Hu ..................... | G06F 17/30675 707/723 |
| 2011/0270861 A1* | 11/2011 | Arshavsky ........ | G06F 17/30448 707/759 |

FOREIGN PATENT DOCUMENTS

| | | |
|---|---|---|
| EP | 1826692 A2 | 8/2007 |
| WO | WO 00-04465 A1 | 1/2000 |

OTHER PUBLICATIONS

PCT/US2012/035877, International Search Report and Written Opinion of the International Searching Authority dated Sep. 27, 2012.

* cited by examiner

*Primary Examiner* — Syling Yen
*Assistant Examiner* — Bao G Tran
(74) *Attorney, Agent, or Firm* — McGuireWoods, LLP

(57) ABSTRACT

Methods and systems for searching a database for a query using an integrated approach of associating transduced query string comparisons with literal query string comparisons reduces computation time and results in more relevant and accurate results. The methods and systems include a processor receiving a query, searching a database for the query, and providing results of the search. The query may be compared to data entries from the database, and a transduced version of the query may be compared to transduced data entries. Results from the comparisons between the query and the data entries may be used to guide the comparisons between the transduced query and the transduced data entries. Search results are determined based on the guided comparisons.

18 Claims, 3 Drawing Sheets

US 10,275,518 B2

INTEGRATED PHONETIC MATCHING METHODS AND SYSTEMS

TECHNICAL FIELD

The disclosed embodiments relate generally to search systems and methods and, more specifically, relate to integrated methods and systems incorporating character phonetics into database searches.

BACKGROUND

String comparisons based on traditional techniques of matching characters and character clusters (polygraphs) do not capture points of similarity that depend upon knowledge of character phonetics, e.g., that in English "ph" usually represents the same sound as "f." While a typographic error in a string generally results in an unrelated symbol being substituted for the correct one, misspelling errors may result in symbols that sound equivalent to the correct symbol. Some current methods of search and string comparison incorporate phonetic equivalents within search results, but often irrelevant search results are found due to serendipitous associations of phonetically equivalent strings. Furthermore, current methods double the amount of computation, since twice as many comparisons are performed for a given query string.

SUMMARY

According to an aspect of this disclosure, systems are described searching a database for a query. The systems may include a processor, a memory element, and a communications device. The processor and memory element are in communication via the communications device. The processor may be operable to compare the query to data entries in the database and compare a transduced version of the query to transduced data entries in a transduced database. The processor may also be operable to identify matching data entries and matching transduced data entries. The processor may also be operable to assign a score to identified matching data entries and to identified matching transduced data entries.

According to another aspect of this disclosure, methods are disclosed for searching a database for a query. The method may include comparing the query to data entries in the database and comparing a transduced version of the query to transduced data entries in a transduced database. Matching data entries and matching transduced data entries are identified. A score is assigned to identified matching data entries and to identified matching transduced data entries.

DETAILED DESCRIPTION

Figure 1:
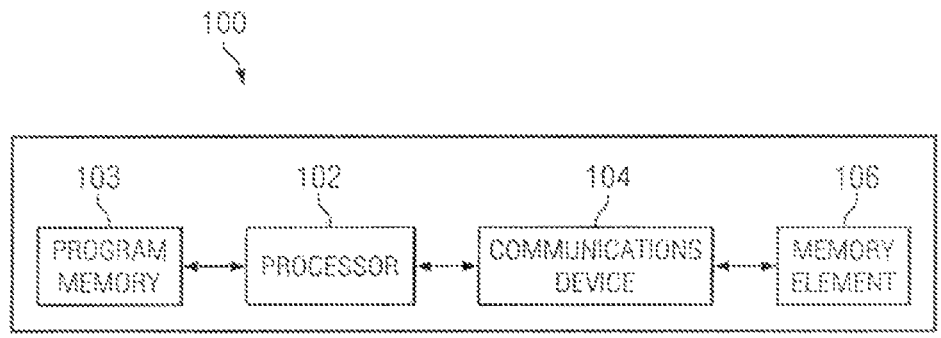
FIG. 1 is a schematic diagram of a system for searching a database for a query, in accordance with the present disclosure.

Commonly owned U.S. Pat. No. 5,841,958 to Buss et al. (the '958 Patent), the entirety of which is herein incorporated by reference, discloses a process for bipartite matching of two sets of objects by a computer program that runs in linear time in the number of objects, and an application of the process to the case where the object sets are character strings. Commonly owned U.S. Pat. No. 5,978,797 to Yianilos (the '797 Patent), the entirety of which is herein incorporated by reference, discloses a method of searching a collection of strings for strings most similar to a given query string, in which bipartite matching is performed for some or all classes of characters or character clusters (polygraphs) found in the query string, and the resulting matching scores combined to yield a similarity score for each string in the collection. Commonly owned U.S. Pat. No. 7,107,263 to Yianilos et al. (the '263 Patent), the entirety of which is herein incorporated by reference, discloses a number of extensions to the method of the '797 Patent, including a method of incorporating character phonetics into the string comparisons, by performing a set of separate string comparisons using phonetically transduced versions of the strings (see, e.g., "Phonetic Search Using Transductive Preprocessing").

Given a search query and a collection of database fields or records that may contain phonetic variations and misspellings, two applications of the same search process may be performed. One application may use the original, untransformed representations of all strings, and the other may use an alternative phonetic representation of all strings. The transformation of a string of symbols into an alternative representation is called "string transduction." The two applications of the process can be performed independently, and the two results lists, containing the highest scoring strings from each of the two applications of the process, can then be merged into a final results list, retaining the higher score for any field or record that occurs in both intermediate results lists.

This method of incorporating character phonetics has several drawbacks. Bipartite matching of the phonetically transduced strings frequently results in serendipitous associations of characters and polygraphs that inflate the resulting score disproportionately to their relevance as indicators of string similarity. Often, the relevance of phonetic equivalence between one or more characters is related to the degree of literal (non-phonetic) matching in the immediate neighborhood of those characters, something not taken into account when literal and phonetic matching is performed independently. Furthermore, the method, in effect, doubles the amount of computation, since twice as many comparisons are performed for a given query string.

Methods and systems are described below for searching a database for a query using an integrated approach. An integrated approach incorporating character phonetics into string comparisons based on matching of characters and polygraphs overcomes drawbacks of current searching methods.

FIG. 1 is a schematic diagram illustrating a system 100 for searching a database for a query. As used herein, a database is a structure for organizing, storing, and retrieving large amounts of data easily, and may include a single store of related information (e.g., a table) and/or one or more stores of related information (e.g., relational database). The database is stored in a data store and is in communication with the system 100. In some embodiments, the database may be stored within the system 100 at a memory element 106. In other embodiments, the database may be stored remotely from the system in an external data store or operational data store.

The system 100 may be used with a plurality of computing environments including, but not limited to, a desktop personal computer or laptop, a machine connected to a cloud computing environment, a machine in a distributed computing environment or a networked computing environment, a personal handheld device (e.g., a mobile phone, PDA, or tablet), in a server accessible by middleware between a sender and receiver machine, etc. In general, the system 100 may be adapted to any computing environment utilizing search capabilities.

The system 100 includes a processor 102, communication device 104, program memory 103, and memory element 106. In an embodiment, the communications device 104 may be a communications bus for transferring data between processor 102 and memory element 106. FIG. 1 shows a single processor 102, communication device 104, program memory 103, and memory element 106 for simplicity sake, but the system 100 may include a plurality of these elements. For example the system 100 may include parallel processors or distributed processors. The system 100 may also include multiple memory elements.

In general, the processor 102 is operable to receive a query, search a database for the query, and provide results of the search. More specifically, the processor 102 may compare the query to data entries in the database. The processor 102 may identify matching data entries that include an n-gram from the query. The processor 102 may also compute and assign a score to the identified matching data entries. In general, algorithms and programs run by the processor 102 are stored in the program memory 103. The processor 102 is in communication with the program memory 103.

The processor 102 may further determine a transduced version of the query. In an embodiment, the transduced version of the query is a phonetic representation of the query. In an embodiment, the transduced version of the query is determined via string transduction methods. The processor 102 may compare the transduced version of the query to transduced data entries from a transduced database. The transduced database and the transduced data entries may be phonetic representations of the database and the data entries, respectively, and may be determined via string transduction methods. The processor 102 may also identify matching transduced data entries including a transduced n-gram from the transduced query. In an embodiment, the processor 102 may use results from identifying the matching data entries when identifying the matching transduced data entries. In an embodiment, the processor 102 may compute and adjust the score assigned to identified data entries based on results from identifying matching transduced data entries.

Memory element 106 may be used for storage of databases, data entries, transduced data entries, query strings, n-grams, look up tables, search results, computed scores associated with results, and/or other variables and values used by the processor 102. In some embodiments, the memory element 106 is used for temporary storage. For example, in some embodiments, the system 100 may be located remotely from the database with data entries. The system 100 may duplicate data entries from the remote database into the memory element 106 for processor computation. The system 100 may also be able to search a remote database, e.g., in a networked computing environment or cloud computing environment, without duplicating the data entries from the remote database. In some embodiments, the memory element 106 may also be a more permanent storage element accessed by the processor 102. For example, in handheld mobile device or tablet embodiments, the processor may search a database in a local memory element 106. In some embodiments with direct processor 102 to local memory element 106 access, however, the system may still have an additional memory element 106 for storing variables, values, and other items.

System 100 may further include a display element for displaying search results to a user and an input element for receiving a query from a user.

Figure 2A:
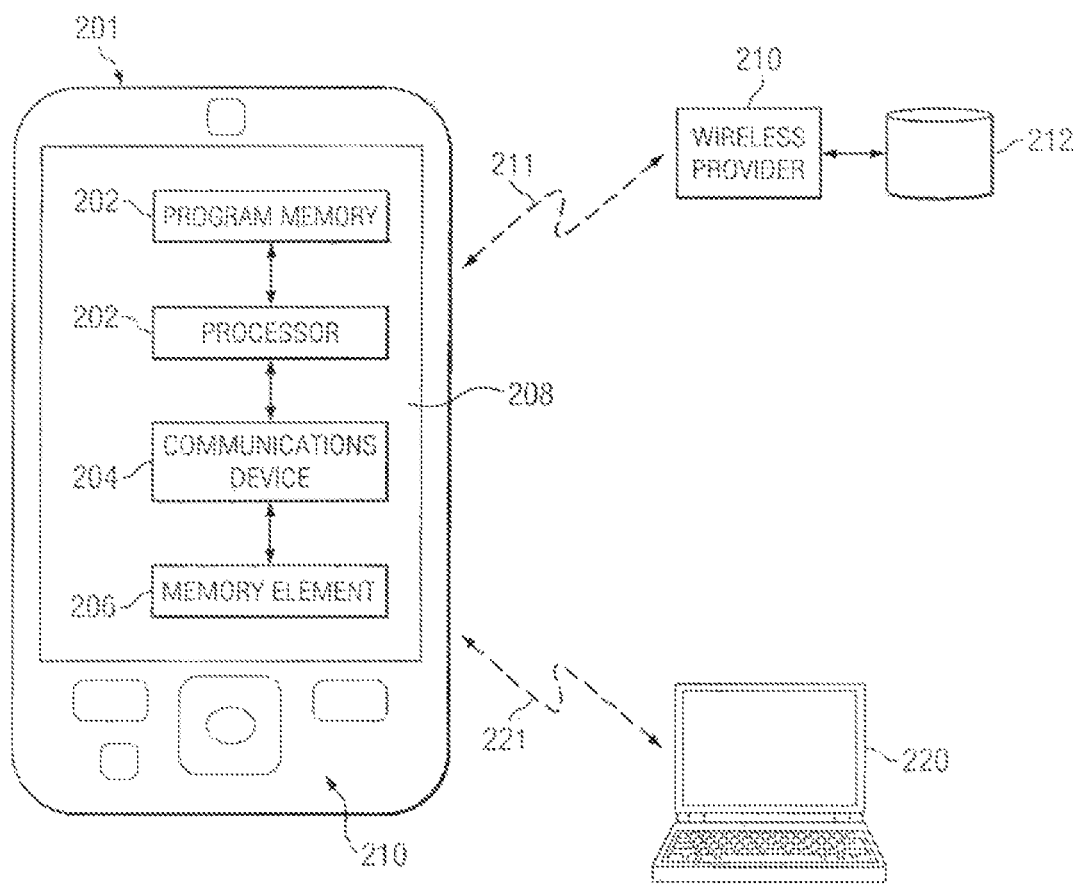
FIG. 2A is a schematic diagram illustrating an exemplary environment for a system for searching a database for a query, in accordance with the present disclosure.
Figure 2B:
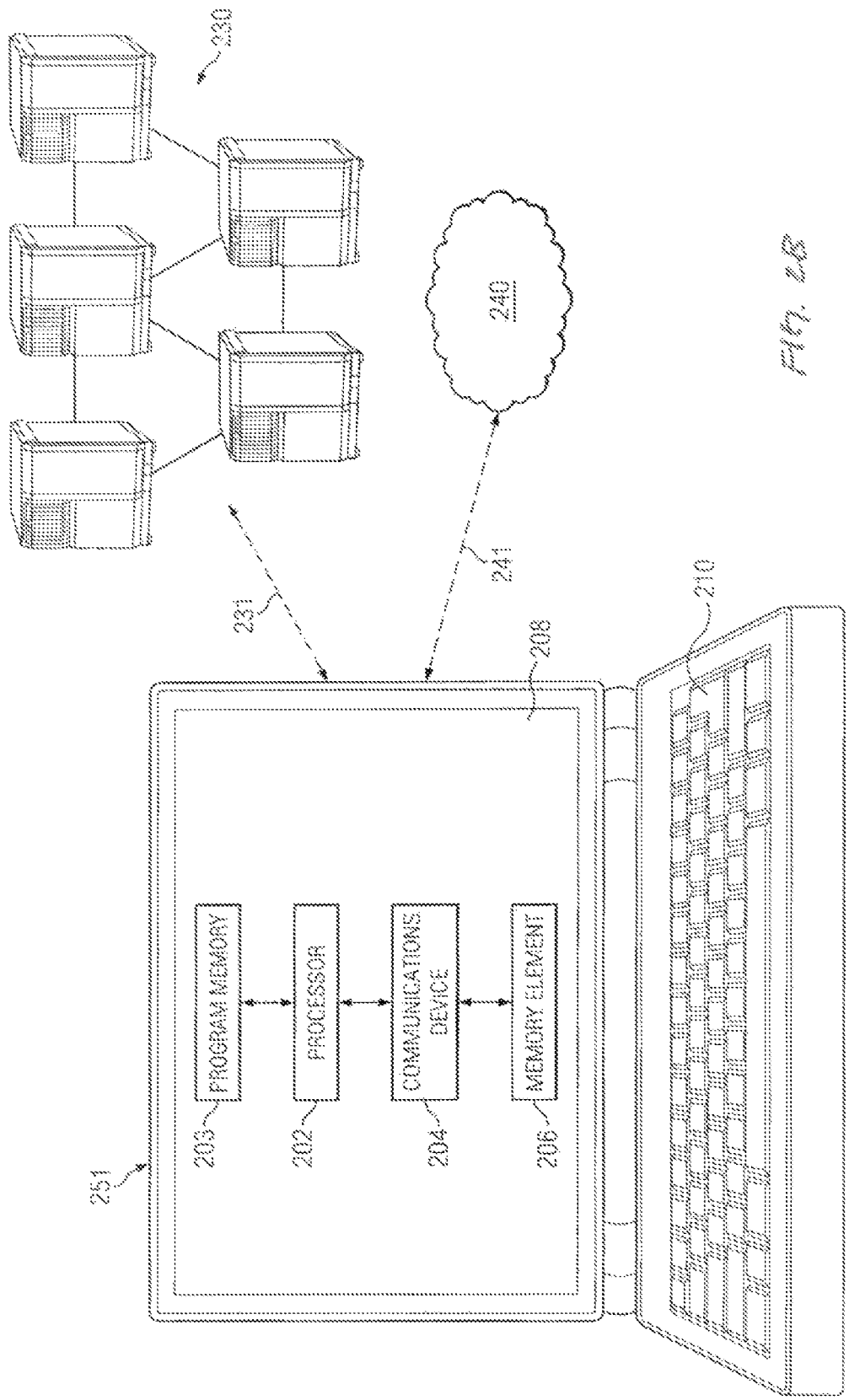
FIG. 2B is a schematic diagram illustrating another exemplary environment for a system for searching a database for a query, in accordance with the present disclosure.

As discussed above in relation to FIG. 1, the system 100 may be adapted to a variety of computing environments. FIGS. 2A and 2B are schematic diagrams illustrating exemplary computing environments using the system 100.

FIG. 2A is a schematic diagram of a handheld mobile device system 201 for searching a database for a query. The system 201 includes a processor 202, communications device 204, program memory 203, and memory element 206, each of which are operable as discussed above in relation to FIG. 1. The system 201 further includes a display 208 and an input 210.

The processor 202 is operable to receive a query, search a database for the query, and provide results of the search. In an embodiment, the system 201 receives a query from a user via the input 210 and provide the results of the search to a user via the display 208.

In general, algorithms and programs run by the processor 202 are stored in the program memory 203. The processor 202 is in communication with the program memory 203. The memory element 206 is operable to store a variety of items including, but not limited to, databases, data entries, transduced data entries, query strings, n-grams, search results, computed scores associated with results, and/or other variables and values used by the processor 202. The communication device 204 is operable to transfer data between processor 102 and memory element 106.

A handheld mobile device user may perform a variety of searches with the system 201. For example, the mobile device user may do a string-based query over the mobile device e-mail inbox. The system 201 may search local storage of the handheld mobile device. In some embodiments, the mobile device may be in communication with (e.g., connection 211) remote servers and data storage 212 via a wireless provider. Thus, the system 201 may be used to access and search remote data storage 212 wirelessly through the user's wireless provider 210. The mobile device may be tethered to or in wireless communication with (e.g., connection 221) a personal computer 220, and the system 201 may be used to search storage within the personal computer. As discussed above, databases in remote storage (e.g., the data storage 212 or remote system 220) and in local storage may be searched using the processor 202; or the databases may be duplicated at the memory element 206, in which case the processor 202 may search the duplicated databases.

FIG. 2B is a schematic diagram of a personal computer system 251 for searching a database for a query. The system 251 includes a processor 202, communications device 204, program memory 203, and memory element 206, each of which are operable as discussed above in relation to FIG. 1. The system 251 further includes a display 208 and an input 210.

The processor 202 is operable to receive a query, search a database for the query, and provide results of the search. In an embodiment, the system 251 receives a query from a user via the input 210 and provide the results of the search to a user via the display 208.

In general, algorithms and programs run by the processor 202 are stored in the program memory 203. The processor 202 is in communication with the program memory 203. The memory element 206 is operable to store a variety of items including, but not limited to, databases, data entries, transduced data entries, query strings, n-grams, search results, computed scores associated with results, and/or other variables and values used by the processor 202. The communication device 204 is operable to transfer data between processor 102 and memory element 106.

A personal computer user may perform a variety of searches with the system 251. For example, the personal computer user may do a string-based search for files and folders. The system 251 may search local storage. In some embodiments, the personal computer may be in communication with (e.g., connection 231) networked computers 230. Thus, the system 251 may be used to access and search remote data stored throughout the computer network. The personal computer may also be in communication with a cloud computing environment 240 via the internet, and the system 251 may be used to search storage within the cloud. As discussed above, databases in remote storage (e.g., the computing network 230 or cloud environment 240) and in local storage may be searched using the processor 202; or the databases may be duplicated at the memory element 206, in which case the processor 202 may search the duplicated databases.

Referring back to FIG. 1, the system 100 may be used to perform a search over a database in any computing environment including, but not limited to, the exemplary environments discussed in relation to FIGS. 2A and 2B. The system 100 of FIG. 1 and the systems 201, 251 of FIGS. 2A and 2B, including processor 102, 202, communication device 104, 204 and memory element 106, 206, may be used to perform the methods discussed below.

Figure 3:
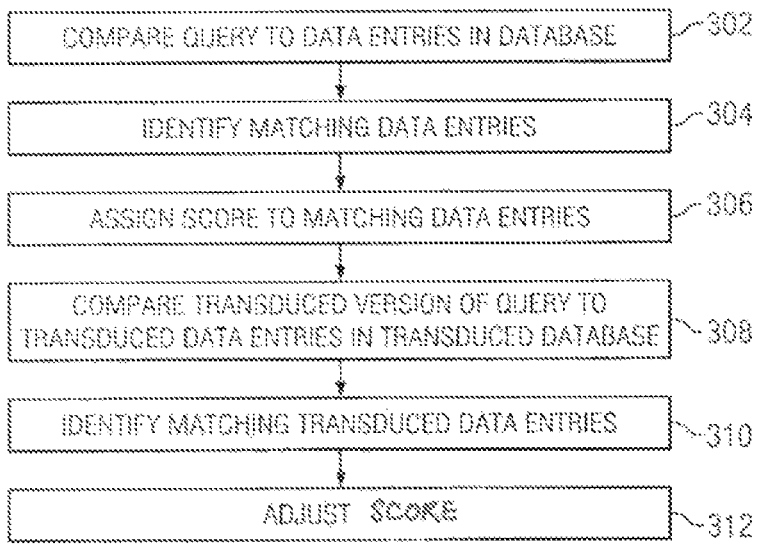
FIG. 3 is a flow diagram illustrating process for searching a database for a query, in accordance with the present disclosure.

FIG. 3 is a flow diagram 300 illustrating a process for searching a database for a query. At action 302, the query is compared to data entries in the database. As discussed above, in some embodiments, the data entries in the database may be duplicated in a local memory element before the query is compared to the data entries in the database.

At action 304, matching data entries are identified. Matching data entries include an n-gram from the query. In some embodiments, bipartite matching is used to identify the matching data entries, but other search algorithms may be used. Identifying matching data entries may include determining n-grams based on the query and scanning the data entries for the n-grams. Data entries having an n-gram may be determined and identified as a matching data entry.

At action 306, a score is assigned to identified matching data entries.

At action 308, a transduced version of the query is compared to transduced data entries in a transduced database. In an embodiment, the transduced version of the query may be determined at any point prior to action 308. The transduced version of the query may be determined by transducing the query to a phonetic equivalent. The transduced version of the query may be stored in a local memory element for access during action 308.

At action 310, matching transduced data entries are identified. Matching transduced data entries may include a transduced n-gram from the transduced query. Identifying matching transduced data entries may include determining n-grams based on the transduced query and scanning the transduced data entries for the n-grams. Transduced data entries having an n-gram may be determined and identified as a matching transduced data entry. In some embodiments, bipartite matching is used to identify the matching transduced data entries.

In an embodiment, identifying matching transduced data entries is based on the identified matching data entries. For example, in an embodiment, matching transduced data entries may be associated with the matching data entries, and some matching transduced data entries may be eliminated based on matching data entries. Accordingly, the phonetically "enhanced" match is consistent with the optimal literal matching that has already been performed. In sum, the literal matching of the strings (action 304) serves as a positive basis, via an appropriate and adjustable heuristic, for constructing phonetic associations. The basis can be used to exclude the formation of matches based on character phonetics that have little or no warrant based on literal matching in the immediate neighborhood of the characters concerned.

In some embodiments, such weakly-warranted phonetic matching could still be permitted, subject to stronger heuristics requiring that such a match be consistent with the results of literal matching elsewhere in the strings, limiting it to the matching of whole words or tokens, etc. Also, in some embodiments, certain literally matching unigraphs and digraphs may be readily identifiable as "noise" (stray matches of single characters in longer, otherwise un-matched tokens). Such noise can be ignored by the phonetic matching heuristics in determining whether a possible phonetic association is consistent with the literal matching.

At action 312 the score assigned to identified data entries is adjusted. In an embodiment, the score is adjusted based on the identified matching transduced data entries.

In an embodiment, a score or a level of association between the query and the identified matching data entries and between the transduced query and the identified transduced matching data entries may be determined. Search results may be provided to a user based on the level of association and a heuristic. In some embodiments, actions 304, 306, 308, 310, and 312 may be repeated for decremental length n-grams. For example, actions 304, 306, 308, 310, and 312 may be repeated using n-grams of varying lengths—from some maximum length on downward. Results may be stored for various length n-grams.

Figure 4:
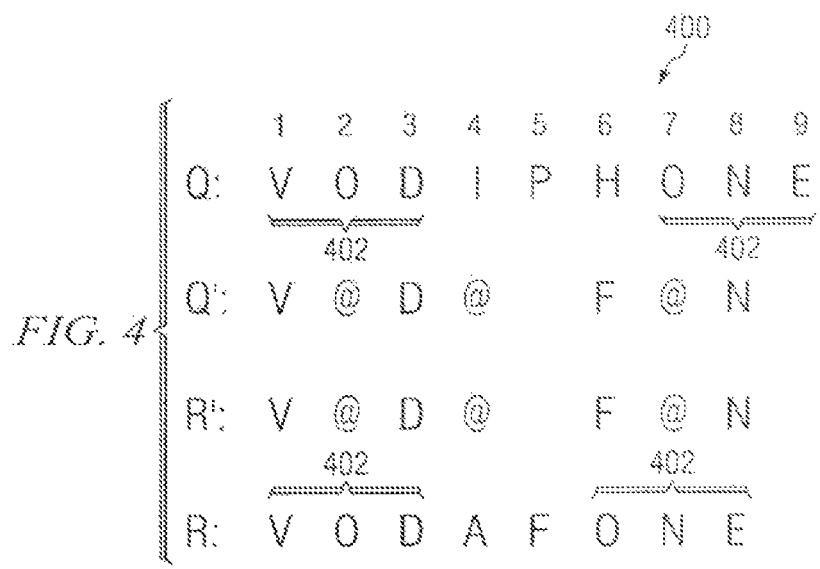
FIG. 4 is a schematic diagram illustrating a matching algorithm, in accordance with the present disclosure.

Bipartite matching of characters and character clusters (polygraphs) may be used for integrating character phonetics into a string similarity computation. FIG. 4 is a schematic diagram 400 illustrating bipartite matching. Let Q and R denote two strings being compared, and let Q' and R' denote the phonetic representations of Q and R. Matching between the literal versions of Q and R (e.g., actions 304 and 306 of FIG. 3) is first performed. Then phonetic matching of characters and polygraphs is performed selectively using the literal matching as a basis and reference (actions 308 and 310 of FIG. 3). The result is phonetic matching enhancing the results of literal matching via addition to, and in some cases, revision of, the connections already made between literally matching characters and polygraphs.

The comparison of two strings using bipartite matching regards the strings as having been embedded "in the line," such that adjacent characters in a string are associated with adjacent integer coordinates on the line. Here, all four strings—the two literal strings and their phonetically transduced versions—are embedded in the line, in such a way that literal and phonetic versions of corresponding characters in the same string have identical coordinates. In cases when literal multigraphs such as "ph" are represented by phonetic unigraphs such as "f," the unigraph is embedded by convention at the same coordinate as the last character of the multigraph.

Given this embedding and its embodiment in an appropriate data structure, the new method is able to detect, for the already-matched character or polygraph between the literal strings, whether there is an enclosing phonetic polygraph that amplifies the literal match.

For instance, consider the strings Q and R and their phonetic transductions Q' and R'. If the strings Q and R are compared, portions 402 of Q and R are matching. If the phonetic transductions Q' and R' are compared, matching phonetic 7-graphs V @ D @ F @ N (the "@" being a generic character replacing any vowel) are detected. The transduced matching may then be associated with the literal matching, and it may be determined that the transduced 7-graphs enclose instances of the two literal matching 3-grams 402 (VOD and ONE). A heuristic may then be deployed to determine whether the two matched literal 3-grams are a sufficient basis for constructing an association between the matching transduced 7-grams.

When the transduced matching phase is complete, the resulting composite match of Q and R may be scored based on a contribution from the matched pairs of characters. These character contributions to the score are weighted according to whether the pair of characters matches literally, or only phonetically. In an embodiment, if they match literally, a weight of 1.0 is assigned. If they match only phonetically, the weight is based on the particular phonetic symbol that constitutes their transduced "agreement." This allows differing weights to be assigned, for instance, to the PH/F equivalence, than are assigned to a mismatched vowel (A/I in the example above). A look-up table may be used to assign weights to various transduced matches.

This weighted approach allows the integrated literal/transduced matching of the strings to be scored intelligently, based on a degree of literalness of the match, and on the particular phonetic equivalences found.

Figure 5:
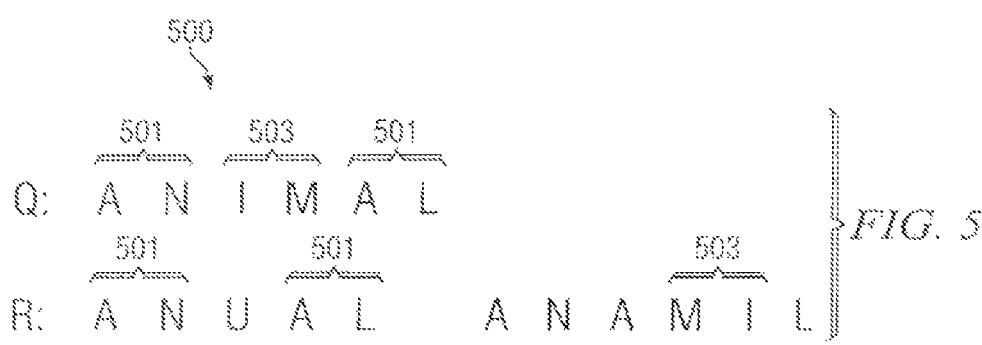
FIG. 5 is a schematic diagram illustrating a matching algorithm, in accordance with the present disclosure.

FIG. 5 is a schematic diagram 500 highlighting the differences between literal and phonetic matching. Q and R denotes two strings being compared. Character sets 501, 503 represent the result of literal matching. For example, the string Q contains AN and AL which are matched with the AN and AL in the word ANUAL from string R as indicated by 501, and string Q also contains IM which is matched with the MI in the word ANAMIL from string R as indicated by 503. The score for literal matching will be relatively low, because portions of the matching are spread between two words in string R.

However, using transduced matching would result in a relatively high score. The string Q may be written as a transduction @ N @ M @ L, where "@" represents a vowel. The second word in string R may also be written as a transduction @ N @ M @ L. Transduced matching would then discover a "perfect" transduced match between the string Q and the second word in string R. Applying a proper heuristic, sensitive to the quality of the matches in terms of character weights (or levels of association), the literal matching may be substantially ignored while the transduced matching would be considered an interesting match. The entirety of string Q may be matched with the second word of string R.

Also, during literal matching, AN from the string Q may also be matched with AN from the second word of string R. The transduced matching of the second word of string R (@ N @ M @ L) may be combined with the literal matching components of string R (AN and MI), resulting in joint transduction match AN @ M @ L. In some embodiments, the methods and systems disclosed herein may use a joint transduction comparison to determine the best matches for any search.

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents for any patent that issues claiming priority from the present provisional patent application.

For example, as referred to herein, a machine or engine may be a virtual machine, computer, node, instance, host, or machine in a networked computing environment. Also as referred to herein, a networked computing environment is a collection of machines connected by communication channels that facilitate communications between machines and allow for machines to share resources. Network may also refer to a communication medium between processes on the same machine. Also as referred to herein, a server is a machine deployed to execute a program operating as a socket listener and may include software instances.

Resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method for searching a database for a query, wherein the database is stored in a data store in communication with a user computing environment, the method comprising:
   receiving a user's request for searching the database for the query from the user computing environment;
   performing a first matching process, the first matching process including:
   comparing the query to data entries in the database stored in the data store in communication with the user computing environment; and
   identifying matching data entries;
   assigning a numerical score to each of the identified matching data entries;
   wherein matching data entries are identified by determining at least one n-gram from the query and scanning the data entries for the at least one n-gram;
   performing a second matching process after performing the first matching process, the second matching process including:
   transducing, using string transduction, the query to a phonetic equivalent of the query, the phonetic equivalent of the query comprising a transduced version of the query;
   comparing the transduced version of the query to transduced data entries in a transduced database;
   identifying matching transduced data entries based on the results from the first matching process, the identified matching transduced data entries identified by:
   determining at least one n-gram from the transduced version of the query;
   scanning the transduced data entries for the at least one n-gram;
   determining matching transduced data entries from among the transduced data entries in the transduced database that match the at least one n-gram from the transduced version of the query, and
   eliminating, from only the determined matching transduced data entries that have been determined to match the at least one n-gram from the transduced version of the query, at least one of the determined matching transduced data entries, each eliminated matching transduced data entry being eliminated based on the results from the first matching process; and
   adjusting the numerical score assigned to each of the identified matching data entries based on the results from the second matching process.

2. The method of claim 1, wherein identifying matching data entries and identifying matching transduced data entries further comprises using bipartite matching.

3. The method of claim 1, wherein identifying matching data entries further comprises:
   determining one or more n-grams based on the query, wherein the n-grams are strings of length n; and
   scanning the data entries for the one or more n-grams.

4. The method of claim 3, further comprising determining data entries having one or more of the n-grams.

5. The method of claim 4, wherein identifying matching transduced data entries further comprises:
   determining one or more transduced n-grams based on the transduced version of the query, wherein the transduced n-grams are strings of length n; and
   scanning the transduced data entries for one or more of the transduced n-grams.

6. The method of claim 5, further comprising determining transduced data entries having one or more of the transduced n-grams.

7. The method of claim 1, wherein identifying matching transduced data entries based on the identified matching data entries further comprises:
   associating matching transduced data entries with the matching data entries; and
   eliminating one or more of the matching transduced data entries based on the matching data entries.

8. The method of claim 1, further comprising:
   determining a level of association between the query and the identified matching data entries and between the transduced query and the identified matching transduced data entries; and
   providing search results based on the level of association and a heuristic.

9. The method of claim 8, further comprising using a look up table to determine the level of association between the query and the identified matching data entries and between the transduced query and the identified matching transduced data entries.

10. The method of claim 1, wherein the matching data entries include an n-gram from the query and wherein the matching transduced data entries include a transduced n-gram from the transduced query, and wherein the n-gram and the transduced n-gram are strings of length n, and further comprising repeating identifying matching data entries and identifying matching transduced data entries for decremental length n-grams.

11. A system for searching a database for a query, wherein the database is stored in a data store in communication with a user computing environment, and wherein the database and user computing environment are in communication with the system, the system comprising:
    a processor;
    a memory element;
    program memory; and
    a communications device, wherein the processor and memory element are in communication via the communications device, and wherein the processor is further in communication with the program memory, and wherein the program memory includes instructions which when executed by the processor cause the processor to perform:
    receiving a user's request for searching the database for the query from the user computing environment;

performing a first matching process, the first matching process including:

comparing the query to data entries in the database; and identifying matching data entries;

assigning a numerical score to each of the identified matching data entries;

wherein matching data entries are identified by determining at least one n-gram from the query and scanning the data entries for the at least one n-gram;

performing a second matching process after performing the first matching process, the second matching process including:

transducing, using string transduction, the query to a phonetic equivalent of the query, the phonetic equivalent of the query comprising a transduced version of the query;

comparing the transduced version of the query to transduced data entries in a transduced database;

identifying matching transduced data entries based on the results from the first matching process, the identified matching transduced data entries identified by:

determining at least one n-gram from the transduced version of the query;

scanning the transduced data entries for the at least one n-gram;

determining matching transduced data entries from among the transduced data entries in the transduced database that match the at least one n-gram from the transduced version of the query, and eliminating, from only the determined matching transduced data entries that have been determined to match the at least one n-gram from the transduced version of the query, at least one of the determined matching transduced data entries, each eliminated matching transduced data entry being eliminated based on the results from the first matching process; and adjusting the numerical score assigned to each of the identified matching data entries based on the results from the second matching process.

12. The system of claim 11, wherein the data entries in the database are duplicated in the memory element, and wherein the processor accesses the data entries in the database by accessing the duplicated data entries in the memory element.

13. The system of claim 11, further comprising a display element for displaying search results to a user.

14. The system of claim 11, further comprising an input element for receiving the query from a user.

15. The system of claim 11, wherein the processor is further operable to determine the transduced version of the query.

16. The system of claim 11, wherein the matching data entries include an n-gram from the query, and wherein the n-gram is of a length n, and wherein the matching transduced data entries include a transduced n-gram from the transduced query, and wherein the transduced n-gram is of the length n.

17. The system of claim 11, wherein the system is located at the user computer environment, and wherein the database is located at the user computer environment.

18. The system of claim 11, wherein the system is located remotely from the user computing environment, and wherein the database is located remotely from the system.

* * * * *